(12) United States Patent
McNeely et al.

(10) Patent No.: US 6,607,907 B2
(45) Date of Patent: Aug. 19, 2003

(54) AIR FLOW REGULATION IN MICROFLUIDIC CIRCUITS FOR PRESSURE CONTROL AND GASEOUS EXCHANGE

(75) Inventors: Michael R. McNeely, Sandy, UT (US); Mark K. Spute, Salt Lake City, UT (US)

(73) Assignee: BioMicro Systems, Inc., Salt Lake City, UT (US)

(*) Notice: Subject to any disclaimer, the term of this patent is extended or adjusted under 35 U.S.C. 154(b) by 80 days.

(21) Appl. No.: 09/855,870

(22) Filed: May 15, 2001

(65) Prior Publication Data

US 2002/0075363 A1 Jun. 20, 2002

Related U.S. Application Data

(60) Provisional application No. 60/204,306, filed on May 15, 2000.

(51) Int. Cl.[7] ............................ C12M 1/36; C12Q 3/00
(52) U.S. Cl. ................ 435/286.6; 435/286.5; 435/287.2; 435/288.5; 435/303.1; 435/6; 435/91.2; 436/180; 422/68.1; 422/100; 422/102; 422/130
(58) Field of Search ............................ 435/3, 6, 91.2, 435/286.5, 286.6, 287.2, 288.5, 293.1, 303.1; 422/68.1, 100, 102, 130, 242; 436/53, 180

(56) References Cited

U.S. PATENT DOCUMENTS

| | | | |
|---|---|---|---|
| 4,676,274 A | 6/1987 | Brown | 137/806 |
| 5,375,979 A | 12/1994 | Trah | 417/52 |
| 5,580,523 A | * 12/1996 | Bard | 210/198.2 |
| 5,783,148 A | * 7/1998 | Cottingham et al. | 422/102 |
| 5,856,174 A | 1/1999 | Lipshutz et al. | 435/286.5 |
| 5,863,801 A | 1/1999 | Southgate et al. | 436/63 |
| 5,897,842 A | 4/1999 | Dunn et al. | 422/131 |
| 5,922,591 A | 7/1999 | Anderson et al. | 435/287.2 |
| 6,036,923 A | 3/2000 | Laugharn, Jr. et al. | 422/82.13 |
| 6,043,080 A | 3/2000 | Lipshutz et al. | 435/287.2 |
| 6,130,098 A | 10/2000 | Handique et al. | 436/180 |
| 6,136,212 A | 10/2000 | Mastrangelo et al. | 216/49 |
| 6,168,948 B1 | 1/2001 | Anderson et al. | 435/287.2 |
| 6,197,595 B1 | 3/2001 | Anderson et al. | 436/180 |

FOREIGN PATENT DOCUMENTS

| | | |
|---|---|---|
| WO | WO 97/22825 | 6/1997 |
| WO | WO 99/39120 | 8/1999 |
| WO | WO 00/53319 | 9/2000 |
| WO | WO 00/78454 | 12/2000 |
| WO | WO 01/09598 | 2/2001 |

OTHER PUBLICATIONS

Anderson, et al., "Microfluidic Biochemical Analysis System", Tranducers '97, pp. 447–480 (1997).

* cited by examiner

Primary Examiner—William H. Beisner
(74) Attorney, Agent, or Firm—Madson & Metcalf

(57) ABSTRACT

A method and system are disclosed for manipulating the flow of gases into and out of a microfluidic circuit to regulate pressure within the circuit or to provide for the delivery of gases to or removal of gases from the circuit. Pressure within the microfluidic circuit may be increased or decreased to modify physical or chemical properties of fluid within the circuit, or to modify reaction kinetics. Gaseous reactants may be added to the circuit, and reaction products or excess reactant gases may be removed the circuit according to the invention. Warm or cool air or other gas may be flowed over liquid reactants within the circuit to perform a warming or cooling function. Various biochemical reactions or processes, including for example polymerase chain reaction (PCR) and ligand-receptor binding, may be performed with the use of the inventive method and system.

31 Claims, 4 Drawing Sheets

AIR FLOW REGULATION IN MICROFLUIDIC CIRCUITS FOR PRESSURE CONTROL AND GASEOUS EXCHANGE

This application claims the benefit of provisional application 60/204,306 filed May 15, 2000.

FIELD OF THE INVENTION

The present invention relates to the field of microfluidic circuitry for biochemical processes or reaction. It relates more specifically to the regulation of pressure and movement of gases into and out of microfluidic circuits.

BACKGROUND OF THE INVENTION

The tools of microfabrication developed primarily by the integrated circuit and microsystems industries may be used to fabricate micrometer-sized structures that are designed to manipulate small volumes of fluids. This area of development is known as microfluidics. Microfluidic structures have been fabricated to integrate and miniaturize many of the fluid handling and analysis steps involved in traditional biological and chemical analysis. The present and forthcoming integrated and miniaturized systems are expected to offer several advantages over traditional methods. These advantages include greater quality control, faster analysis times, higher throughput of sample processing, and lower costs primarily related to smaller sample volumes and smaller amounts of chemicals and reagents required to analyze these smaller volumes.

Many different methods of fluid manipulation and sample analysis have and will be created. The numerous varying chemical and physical properties associated with the multitude of possible sample types make it difficult, if not impossible, for one sample manipulation or analysis technique to be used for all microfluidic applications. For example, there are many methods of pumping fluids through a microfluidic processing circuit, some of which are useful for ionic solutions, some of which are more appropriate for larger flow rates, and some of which utilize no moving parts. These include electrokinetics, electro-hydrodynamics, and pressure driven flow. Pressure driven flow can be further broken down into pneumatics, hydraulics, capillarity and centrifugal flow.

In most utilizations of pressure driven flow the microfluidic circuit is open to the atmosphere at one or more points downstream of the moving fluid so that air displaced by the moving fluid is allowed to escape the circuit. This prevents unwanted buildup of pressure that may oppose the desired fluid movement. The fluid may be prevented from escaping the circuit through the air displacement ducts by use of capillary valves, porous hydrophobic membranes, or similar methods, where air may escape but the fluid is contained.

The passive, or mostly passive, behavior of the air displacement ducts and possible corresponding capillary valves, are generally sufficient for their intended purpose. However, benefit may be gained by altering the pressure inside the microfluidic circuit, which cannot be readily carried out with passive air displacement ducts.

As the physical and chemical properties of a fluid, or the reaction rates of a reaction in which the fluid is involved, may vary with pressure, in some applications it would be beneficial for the fluid within a fluid circuit to experience a pressure higher or lower than the normal ambient pressure to which it is exposed via the air ducts.

Some reactions involve the production of gaseous phases that it is desirable to remove from the reaction chamber. This may be needed to prevent buildup of pressure within the system, to keep the gases from possibly poisoning further reactions, or to allow for analysis of the gases that are generated. In addition, some reactions may benefit from the delivery of gaseous materials, such as for the delivery of gaseous reagents, or for heating or cooling the system. Therefore, it would be desirable to provide a method for removing gaseous components from or introducing gaseous components to the microfluidic system.

SUMMARY OF THE INVENTION

The present invention discloses a method and system for manipulating the flow of gaseous materials into and out of a microfluidic circuit via air displacement ducts common in many pressure driven microfluidic systems. Air displacement ducts are used in combination with valves, pumps, and other pressure regulation devices to provide for the delivery or removal of gaseous reaction constituents or products, and to allow for the control of ambient pressure, and hence reaction pressure, within a microfluidic system. The air displacement ducts are not in direct communication with the atmosphere, but rather are connected to active pressure regulation devices such as valves and pumps that allow the air flow to be controlled through each duct individually, if desired. These active pressure regulation devices may be integrated within the microfluidic substrate, or they may be permanent or semi permanent members of an external system to which the microfluidic system is interfaced.

One object of the invention is to allow manipulation of the pressure within a microfluidic circuit in an effort to change the reaction process of a sample when compared to normal atmospheric conditions.

Another object of the invention is to allow for the delivery or removal of gaseous reactants or products from the microfluidic system, or simply to deliver hot or cold air to heat or cool a microfluidic sample. In most applications the air remaining in the fluid circuit is at approximately the same pressure as the ambient atmosphere, due to the presence of the air displacement ducts.

DETAILED DESCRIPTION OF THE INVENTION

Pressure driven microfluidic circuits, such as those connected with external pumping systems, generally require a system outlet that allows air or other gaseous fluids to be displaced out of the system as the fluid circuit fills with liquid fluid. This system outlet may be designed to allow the exit of liquid fluid as well as air (or other gaseous fluid), or it may be designed to only allow displaced air to escape, and not liquid. In addition, some embodiments may allow air to enter or exit depending on the movement of liquid within the system, and some embodiments provide for multiple air displacement ducts, at different sites along the fluid circuit, to allow for more complex fluid manipulation.

Figure 1:
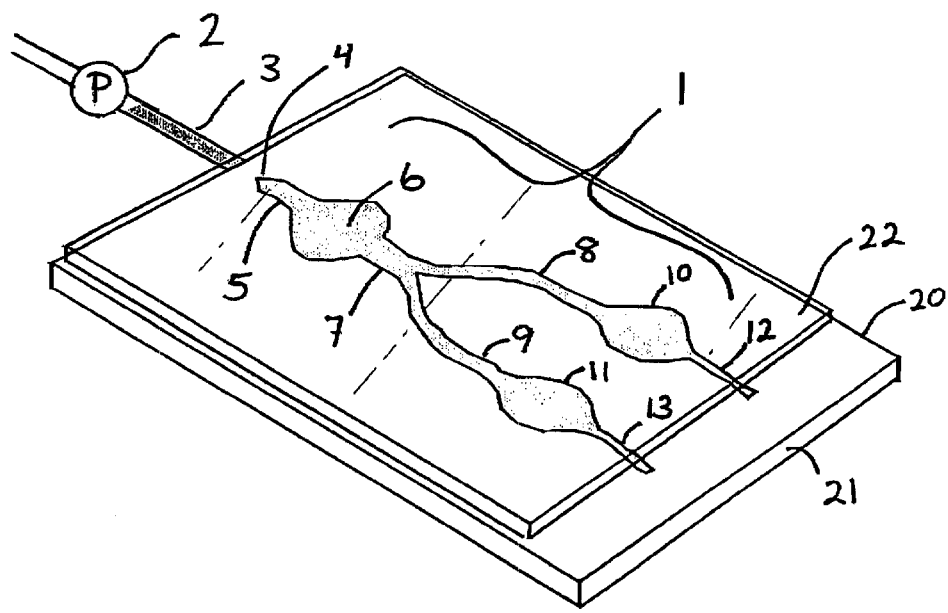
FIG. 1 is a perspective view of a first embodiment of the invention having two air displacement channels.
Figure 2:
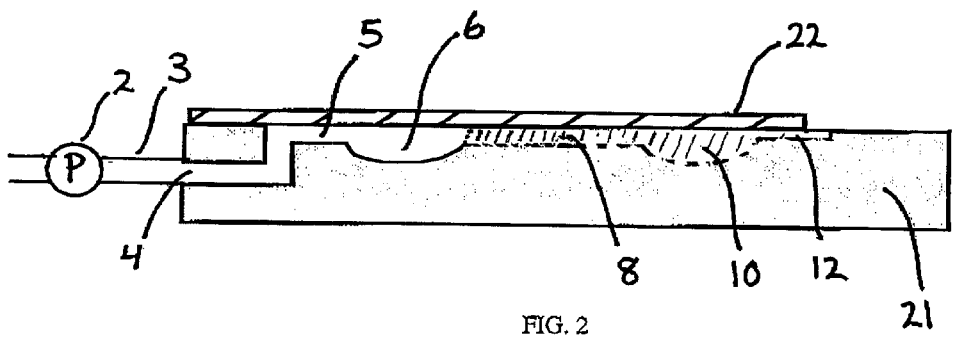
FIG. 2 is a cross-sectional view of the embodiment of the invention shown in FIG. 1.

An example of a fluid circuit that permits air to escape as liquid fluid enters the circuit is shown in FIGS. 1 and 2. It should be noted that the term "air" is used because it is typically the case that air is displaced from within the fluid circuit, but that it is contemplated that other gases or gaseous mixtures may also travel through the air displacement ducts of the invention. Liquid fluid is pumped into microfluidic circuit 1 by pump 2, via tubing 3 to inlet 4 of microchannel 5. Microchannel 5 leads to chamber 6. Microchannel 7 exits chamber 6 and branches into microchannels 8 and 9, leading to chambers 10 and 11, respectively. Air displacement ducts 12 and 13 are connected to chambers 10 and 11, and thus indirectly to microchannels 8 and 9. In FIG. 1, microfluidic circuit 1 is formed in surface 20 of substrate 21 and is covered by a lid 22 sealingly placed on top of substrate 21 to contain the fluid within the microfluidic circuit 1. The ends of air displacement ducts 12 and 13 extend past the edge of lid 22 to communicate with the external atmosphere. This allows for the circuit to be in communication with the outside, so that air displaced by the incoming liquid fluid can pass out of the circuit. FIG. 2 is a cross-sectional view of the device in FIG. 1, with inlet 4 shown at the left.

If the air displacement ducts allow direct communication between the inside of the microfluid circuit and the external ambient atmosphere, as shown in FIGS. 1 and 2, any reaction or process involving the fluid within the microfluidic circuit will take place at ambient atmospheric conditions, as far as pressure is concerned. The air displacement ducts typically are not capable of ensuring equi-temperature or equi-humidity with the ambient atmosphere. Also, the equi-pressure condition can only be ensured if the fluid in the system is static. Dynamic fluid movement may alter the pressure conditions within the circuit due to a possible pressure drop across the air displacement duct.

Many air displacement ducts are designed to allow only the movement of air or other gaseous materials, and not liquid fluid. This can be done by including within the air displacement duct a capillary stop barrier, a porous hydrophobic membrane, or another structure that allows air to flow but impedes liquid movement. In previous work of the inventors, small channels in hydrophobic materials were used as air escape ducts. The air escape ducts were on the order of 10–15 μm in diameter, whereas the normal fluid channels were 10–20 times larger. This allowed for air to escape readily, but required relatively large pressures to force the fluid through the small air ducts due to their hydrophobic nature. However, it should be stated that any channel downstream of fluid in a microfluidic circuit could be considered an air duct, whether air passes through it exclusively, or whether first air and then fluid as the fluid advances through the circuit.

Many important bio-chemical processes take place at elevated temperatures (greater than 20° C.). These include incubation steps for cell proliferation, some ligand-receptor binding events, and polymerase chain reaction (PCR). Some reactions are performed at elevated temperatures to accelerate the rate of the reaction or process, or because the elevated temperature is required for the reaction to take place at all. At some elevated temperatures, particularly ones approaching the boiling point of the fluid involved, steam generation may increase to a level that effects the concentration of the reactants in the sample, or causes downstream channels to be saturated with vapor. This may be detrimental to the efficiency of the present reaction or of downstream processes, or it may be the mechanism of the intended reaction, such as promoting evaporation to increase the concentration of a species of interest.

TABLE 1

Vapor pressure of water at various temperatures.

| deg C | MmHg | psi |
|---|---|---|
| 5 | 6.5 | 0.13 |
| 10 | 9.2 | 0.18 |
| 15 | 12.8 | 0.25 |
| 20 | 17.5 | 0.34 |
| 25 | 23.8 | 0.46 |
| 30 | 31.8 | 0.62 |
| 35 | 41.2 | 0.80 |
| 40 | 55.3 | 1.07 |
| 45 | 71.9 | 1.39 |
| 50 | 92.5 | 1.79 |
| 55 | 118 | 2.28 |
| 60 | 149.4 | 2.89 |
| 65 | 187.5 | 3.63 |
| 70 | 233.7 | 4.52 |
| 75 | 289.1 | 5.59 |
| 80 | 355.1 | 6.87 |
| 85 | 433.6 | 8.39 |
| 90 | 525.8 | 10.17 |
| 95 | 633.9 | 12.26 |
| 100 | 760 | 14.70 |
| 105 | 906 | 17.52 |
| 110 | 1075 | 20.79 |
| 115 | 1268 | 24.53 |
| 120 | 1489 | 28.80 |
| 125 | 1741 | 33.67 |
| 130 | 2026 | 39.19 |
| 135 | 2347 | 45.40 |
| 140 | 2711 | 52.44 |
| 145 | 3117 | 60.29 |
| 150 | 3570 | 69.05 |

Source: CRC Handbook of Chemistry and Physics, 65th Ed., p D-193, CRC Press, Boca Raton, Fla. 1984.

In these, and other instances where steam generation, or boiling, is not preferred, the present invention provides for all ducts connected to downstream channels to be pressurized in order to pressurize the complete fluidic system. As the ambient pressure is increased, the fluid pressure is also increased. This causes the vapor pressure of the fluid to equal the ambient pressure at higher temperatures, causing a reduction in steam generation, or raising the boiling point of the fluid. Table 1 shows the relationship between water vapor pressure and temperature. Assuming normal atmospheric pressure (14.7 psi) an increase in microsystem pressure of only 2.8 psi will increase the boiling point of water by approximately 5 degrees. If other factors in the reaction require a temperature near the normal boiling point of water, pressurizing the system only slightly will allow the normal boiling point to be reached, but at a reduction in steam generation. In another case, as can be seen from Table 1, if the internal pressure were reduced by approximately 14 psi the vapor pressure of water drops to near room temperature and water may boil without heating.

Figure 3:
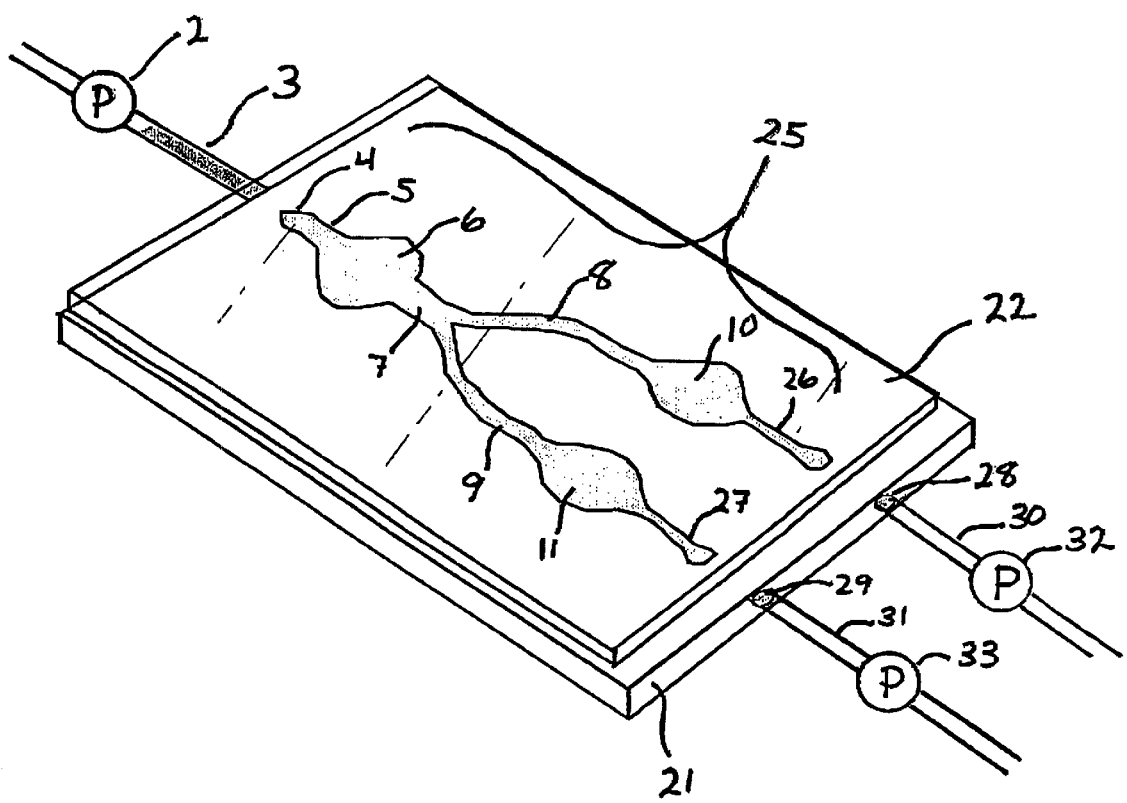
FIG. 3 is a perspective view of a second embodiment of the invention having two air displacement channels leading to outlets in the substrate.

FIG. 3 shows fluid circuit 25, which is a modification of fluid circuit 1 of FIGS. 1 and 2, in which air displacement ducts 26 and 27 pass into substrate 21 and exit on the side of substrate 21. Tubes 31 and 32 can be readily connected to outlets 28 and 29 of air displacement ducts 26 and 27, respectively. Air displacement ducts 26 and 27 can then be connected to pressure regulation devices 32 and 33 (which may be the same or separate pressure sources), such as a pump or a pressurized gas supply regulated by a valve. Since the volumes of microfluidic systems are usually quite small (total volume may range from 1–1000 µL for one circuit, depending on its complexity), it is not necessary to use a high volume displacement pump to substantially change the pressure of a system; a low-volume pump, such as a syringe pump, is may be used effectively to add or extract gas from the system.

Figure 4:
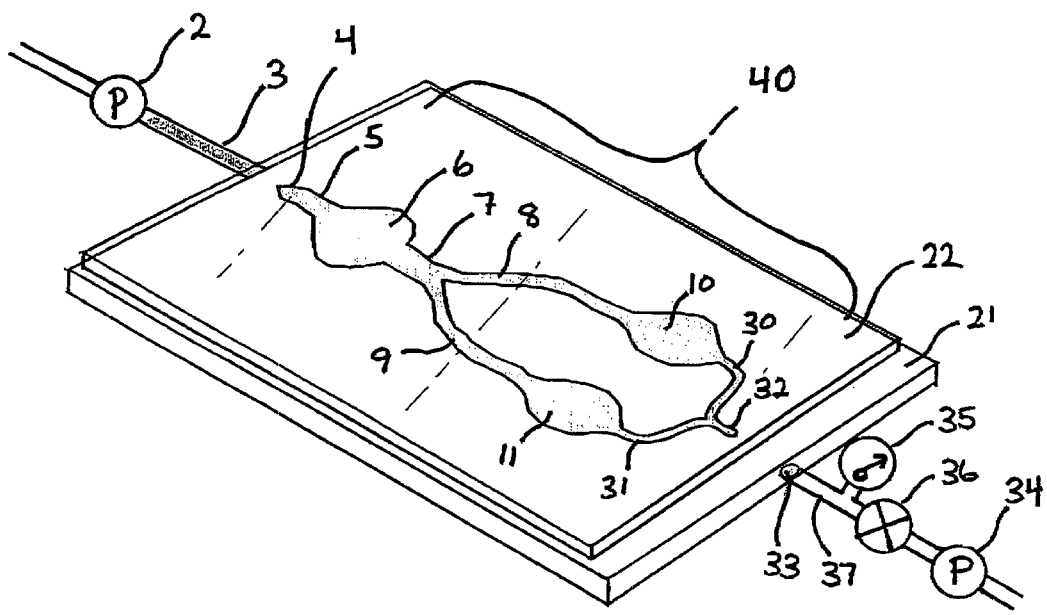
FIG. 4 is an embodiment of the invention having two air displacement channels leading to a single outlet.
Figure 5:
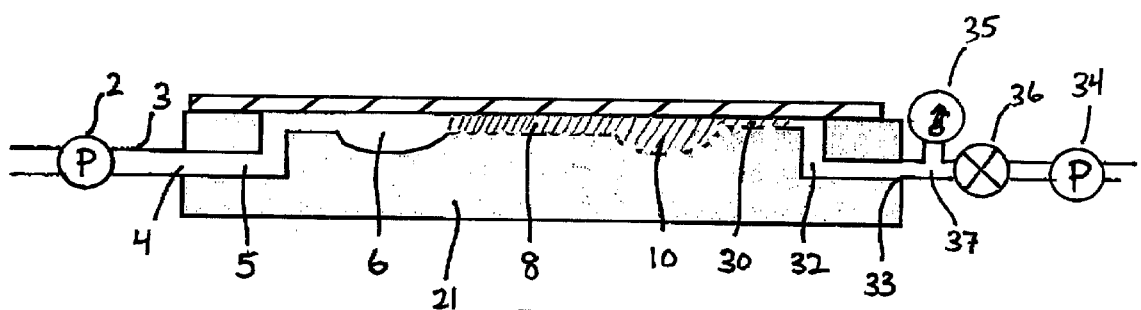
FIG. 5 is a cross-sectional view of the embodiment of the invention shown in FIG. 4.

FIGS. 4 and 5 are perspective and sectional views of a microfluidic circuit similar to that shown in FIG. 3, but with air displacement ducts 30 and 31 joined together to form a single air displacement duct 32 leading to outlet 33 for connection to a single pressure regulation device.

In work done by the inventors, microfluidic circuits were fabricated on the surface of a Teflon™ substrate using excimer laser ablation. The circuits usually contained a minimum of one inlet and one outlet. The inlet and outlet were fabricated by cross drilling small holes from the side and top of the substrate so that they connect and a clear channel exists from the side of the substrate up to the surface of the substrate, where the top hole is connected to the surface channels, as depicted in FIGS. 3–6. The outlet, or final air escape duct, was fabricated in the same manner. A friction fit of tubing into the inlet and outlet was sufficient for delivering pressures of up to 25 psi. It is assumed they would also allow for a reduction in pressure of a few psi. It was found that the air connection did not need to be perfectly leak proof, so long as the positive or negative gas flow was greater than any leakage that occurred. The top of the substrate was covered with a hydrophobic film, such as Teflon AF™ coated vinyl membrane, and pushed onto the substrate with a polycarbonate lid held by thumbscrews. It was not necessary for the lid to be perfectly sealed, since all surfaces were hydrophobic, which reduces the problems associated with micro cracks.

EXAMPLE 1

Polymerase Chain Reaction (PCR) is a process that consists of a cyclical heating and cooling of a reaction mixture. The high temperature in the cycle approaches the boiling point of water, and can even surpass it at higher elevations. In the case when the boiling point of water needs to be elevated to prevent boiling and evaporation, this can be accomplished by increasing the ambient pressure inside the microfluidic circuit. FIG. 4 shows an embodiment of the invention in which two air displacement ducts 30 and 31 are joined into a single duct 32 prior to the channel being fed into the substrate 21 and out the end. The outlet of the duct would be interfaced with tubing 37, valve 36, and a pump 34 to control air pressure in a manner similar to that in which inlet of the fluid circuit is connect to a pump for fluid delivery. FIG. 5 shows a side view of the system of FIG. 4.

Fluid circuit 40 is filled with water up to a series of parallel processing chambers 10 and 11. Air displacement ducts 30 and 31 are joined into a single air displacement duct 32 and connected to the system outlet 33. A valve 36 connected to the outlet tubing 37 is opened to allow for air to be displaced out of the system as it fills with liquid fluid. Once chambers 10 and 11 are filled, the system is pressurized by pumping air via a pressure regulation device 34 (which may be, for example, a syringe) connected to outlet tubing 37 into circuit 40 via the outlet 33. A pressure gauge 35 may be connected to the system to indicate the pressure reached, and to monitor pressure during cycling. Once the desired pressure is reached, valve 36 may be closed and pressure regulation device 34 removed or turned off. Liquid fluid pump 2 may need to be activated to compensate for any backward movement of the fluid caused by the increase in downstream air pressure. The whole substrate can then be heated in the thermal cycling process.

EXAMPLE 2

Figure 6:
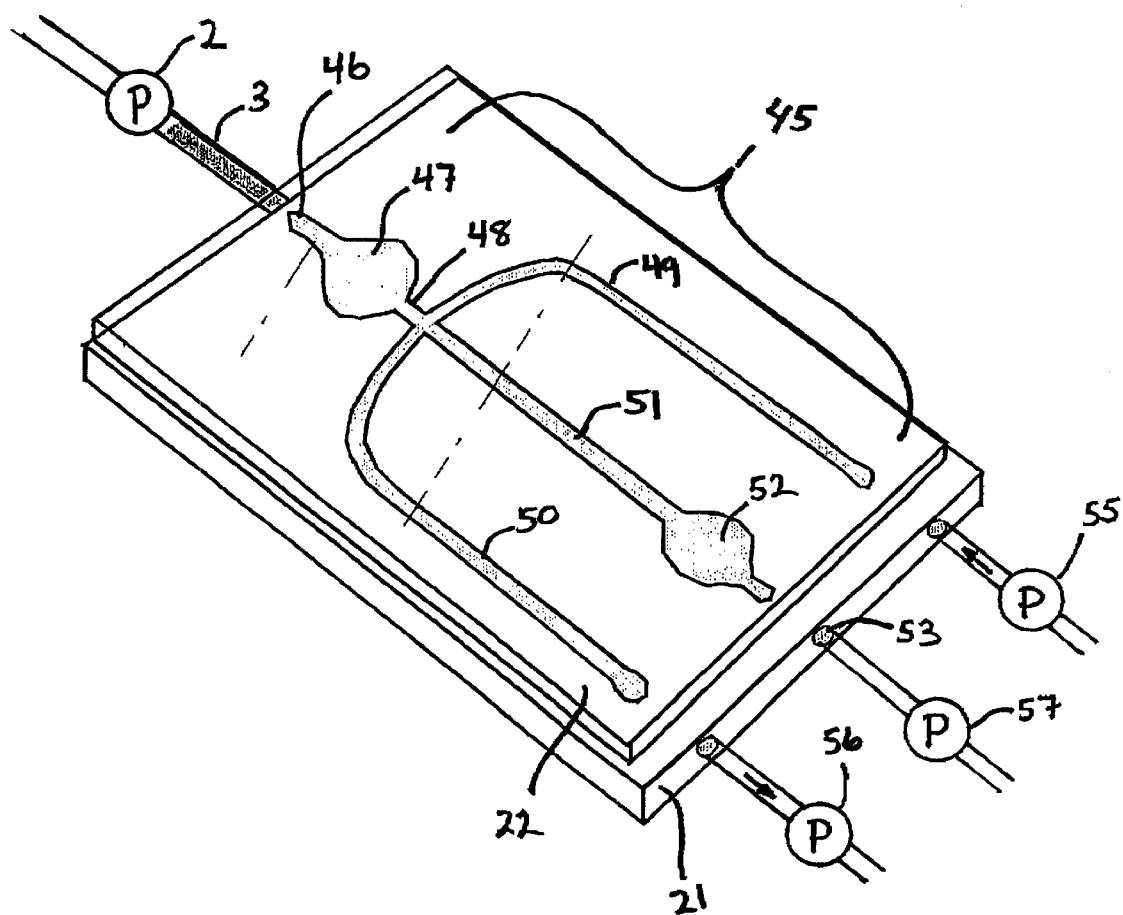
FIG. 6 is a perspective view of another embodiment of the invention including a microfluidic circuit having one inlet leading to a well with one outlet channel, and two cross channels joined thereto.

FIG. 6 illustrates an alternative embodiment of the invention which makes it possible to remove steam (or other vapor) generated by a heating process by a slight air flow caused by air being passed in and out of the microfluidic circuit by a cross channel. FIG. 6 shows microfluidic circuit 45 with one inlet 46 leading to reaction chamber 47 with one outlet 48. Near outlet 48 are two cross channels 49 and 50, which function as air ducts. Air flows into the system via first air duct 49, driven by positive pressure from pressure regulation device 55. The air from air duct 49 crosses main microchannel 51 between reaction chambers 47 and 52 in the vicinity of reaction chamber 47, and is drawn out of the system via second air duct 50, due to negative pressure from pressure regulation device 56. Outlet duct 53 of chamber 52 and first and second air ducts 49 and 50, respectively, extend to the end of substrate 21, where they can be connected to individually. In addition to pressure regulation devices 55 and 56 on first and second air ducts 49 and 50, a third pressure regulation device 57 may be provided on outlet duct 53 to regulate overall system pressure.

EXAMPLE 3

A sample can be concentrated by accelerating evaporation. This can be accomplished by passing the dry gas into the system via downstream air ducts, and removing the gas at the same rate via an air duct closest to the sample that is to be concentrated, for example through the use of a circuit of the type shown in FIG. 6.

EXAMPLE 4

Many processes in organic chemistry involve purification of organic molecules by suspending a mixture in a solvent and allowing the solvent to evaporate. As the solvent evaporates the molecule of interest will precipitate out. Such is the case in DNA purification by ethanol precipitation.

This can be accomplished by maintaining the solvent mixture in a microfluidic evaporation chamber connected to one or more air ducts. The air duct is connected to a vacuum pump and the internal system pressure is slowly lowered to allow for accelerated and controlled evaporation on a micro scale.

Although the above examples illustrate substrates containing only a single microfluidic circuit, and microfluidic circuits containing only a single inlet and one, two or three outlets, it will be appreciated that the principal of the invention can be applied to devices in which multiple microfluidic circuits are formed on a single substrate. Moreover, the inventive air flow and pressure regulation method may be applied to microfluidic circuits having larger numbers of inlets and outlets, larger numbers of microchannels, reaction chambers, and air displacement ducts, and greater complexity of interconnections between these structures. While the invention has been disclosed in this patent application by reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

LIST OF REFERENCES

R. C. Anderson et al., *Microfluidic Biochemical Analysis System, IEEE Transducers '97,* page 477–80, 1997.

U.S. Pat. No. 5,897,842
U.S. Pat. No. 5,856,174
U.S. Pat. No. 5,375,979
WO9722825A1
WO9939120A1
All publications, patents and patent applications cited herein are incorporated by reference.

What is claimed is:

1. A microfluidic circuit comprising:
   one or more connected microchannels;
   at least one air displacement duct in gaseous communication with one or more of the connected microchannels;
   at least one pressure regulation device connected to the at least one air displacement duct to control pressure within the microfluidic circuit; and
   at least one reaction chamber disposed within the microfluidic circuit in fluid communication with the one or more connected microchannels and in gaseous communication with the at least one air displacement duct and the at least one pressure regulation device, said reaction chamber configured to permit a chemical or physical reaction therein, wherein the at least one pressure regulation device influences reaction kinetics of the chemical or physical reaction or influences physical or chemical properties of fluid within the microfluidic circuit without producing unintentional back-flow or forward-flow in the reaction chamber.

2. A microfluidic circuit according to claim 1, wherein the at least one pressure regulation device comprises a valve.

3. A microfluidic circuit according to claim 1, wherein the at least one pressure regulation device comprises a pump.

4. A micro fluidic circuit according to claim 1, wherein the at least one pressure regulation device increases the pressure within the microfluidic circuit.

5. A microfluidic circuit according to claim 1, wherein the at least one pressure regulation device decreases the pressure within the microfluidic circuit.

6. A microfluidic circuit according to claim 1, wherein the air displacement duct and the pressure regulation device are configured to deliver gaseous reactants or products to the reaction chamber.

7. A microfluidic circuit according to claim 1, wherein the air displacement ducts and the pressure regulation devices are configured to remove gaseous reactants or products from the reaction chambers.

8. A microfluidic circuit according to claim 1, wherein the pressure regulation device increases the pressure within the reaction chamber.

9. A microfluidic circuit according to claim 8, wherein the chemical or physical reaction comprises hyperbaric PCR.

10. A microfluidic circuit according to claim 1, wherein the pressure regulation device decreases the pressure within the reaction chamber.

11. A microfluidic circuit according to claim 10, wherein the chemical or physical reaction comprises hypobaric PCR.

12. A micro fluidic circuit according to claim 1, wherein the pressure regulation device is located external to the microfluidic circuit.

13. A microfluidic circuit according to claim 1, further comprising:
    an inlet to allow fluid to be introduced into one or more of the connected microchannels; and
    an outlet to allow fluid to be removed from one or more of the connected micro channels.

14. A microfluidic circuit according to claim 1, having first and second air displacement ducts in gaseous communication with one of the connected microchannels, wherein the first air displacement duct is configured to introduce a gaseous fluid into said microchannel and the second air displacement duct is configured to remove gaseous fluid from said microchannel.

15. A microfluidic circuit according to claim 14, wherein gaseous fluid flows across the microchannel from the first air displacement duct to the second air displacement duct to provide gaseous cross-flow through the microchannel.

16. A process of modifying the physical or chemical properties of fluid in a microfluidic circuit comprising one or more connected microchannels, at least one air displacement duct in gaseous communication with one or more of the connected microchannels, at least one pressure regulation device connected to the air displacement duct, and at least one reaction chamber disposed within the microfluidic circuit in fluid communication with the one or more connected microchannels and in gaseous communication with the at least one air displacement duct and the at least one pressure regulation device, said reaction chamber configured to permit a chemical or physical reaction therein, said process comprising the steps of:
    introducing a liquid fluid into the reaction chamber;
    controlling the pressure of a gaseous fluid downstream of said liquid fluid with the pressure regulation device to maintain a desired pressure on the liquid fluid and to influence reaction kinetics of the chemical or physical reaction or influence physical or chemical properties of liquid fluid within the reaction chamber; and
    controlling the pressure of the liquid fluid introduced into the microfluidic circuit to prevent unintentional back-flow or forward-flow.

17. A process according to claim 16, wherein the reaction kinetics of the chemical or physical reaction are controlled by the pressure of the gaseous fluid.

18. A process according to claim 16, wherein the air displacement ducts and the pressure regulation device deliver gaseous reactants or products to the reaction chamber.

19. A process according to claim 16, wherein the air displacement ducts and the pressure regulation device remove gaseous reactants or products from the reaction chamber.

20. A process according to claim 16, wherein the step of controlling the pressure of the gaseous fluid downstream of the liquid fluid comprises the step of increasing the pressure of the gaseous fluid above atmospheric pressure and wherein the chemical or physical reaction comprises hyperbaric PCR.

21. A process according to claim 16, wherein the step of controlling the pressure of the gaseous fluid downstream of the liquid fluid comprises the step of decreasing the pressure of the gaseous fluid below atmospheric pressure and wherein the chemical or physical reaction comprises hypobaric PCR.

22. A process according to claim 16, wherein the boiling point of the liquid fluid in the microfluidic circuit is controlled by the pressure of the gaseous fluid.

23. A process according to claim 16, wherein generation of vapor from the liquid fluid in the microfluidic circuit is controlled by the pressure of the gaseous fluid.

24. A microfluidic circuit comprising:
    one or more connected microchannels;
    at least one reaction chamber disposed within the microfluidic circuit in fluid communication with the one or more connected microchannels, said reaction chamber configured to permit a chemical or physical reaction therein;

one or more air displacement ducts in gaseous communication with one or more of the connected microchannels; and a pressure regulation device connected to each air displacement duct to control pressure within the microfluidic circuit, wherein the air displacement ducts and the pressure regulation devices deliver a gaseous reactant or product to the reaction chamber, and wherein the pressure regulation device influences reaction kinetics of the chemical or physical reaction or influences physical or chemical properties of fluid within the microfluidic circuit without producing unintentional back-flow or forward-flow in the reaction chamber.

25. A micro fluidic circuit according to claim 24, wherein the pressure regulation device comprises a valve.

26. A microfluidic circuit according to claim 24, wherein the pressure regulation device comprise a pump.

27. A microfluidic circuit according to claim 24, wherein the pressure regulation device is located external to the microfluidic circuit.

28. A microfluidic circuit comprising:

one or more connected microchannels;

at least one reaction chamber disposed within the microfluidic circuit in fluid communication with the one or more connected microchannels, said reaction chamber configured to permit a chemical or physical reaction therein;

one or more air displacement ducts in gaseous communication with one or more of the connected microchannels; and a pressure regulation device connected to each air displacement duct to control pressure within the microfluidic circuit, wherein the air displacement ducts and the pressure regulation devices remove a gaseous reactant or product from the reaction chamber, and wherein the pressure regulation device influences reaction kinetics of the chemical or physical reaction or influences physical or chemical properties of fluid within the microfluidic circuit without producing unintentional back-flow or forward-flow in the reaction chamber.

29. A microfluidic circuit according to claim 28, wherein the pressure regulation device comprises a valve.

30. A microfluidic circuit according to claim 28, wherein the pressure regulation device comprises a pump.

31. A microfluidic circuit according to claim 28, wherein the pressure regulation device is located external to the microfluidic circuit.

* * * * *